(No Model.)

A. B. KAY.
PISTON ROD PACKING.

No. 530,423. Patented Dec. 4, 1894.

Witnesses:
Jas. E. Hutchinson.
Henry C. Hazard.

Inventor.
Allan B. Kay, by
Dindle and Russell, his Attys.

UNITED STATES PATENT OFFICE.

ALLAN B. KAY, OF NEW YORK, N. Y.

PISTON-ROD PACKING.

SPECIFICATION forming part of Letters Patent No. 530,423, dated December 4, 1894.

Application filed September 16, 1893. Serial No. 485,656. (No model.)

*To all whom it may concern:*

Be it known that I, ALLAN B. KAY, of New York, in the county of New York, and in the State of New York, have invented certain new and useful Improvements in Piston-Rod Packing; and I do hereby declare that the following is a full, clear, and exact description thereof, reference being had to the accompanying drawings, in which—

Figure 1:
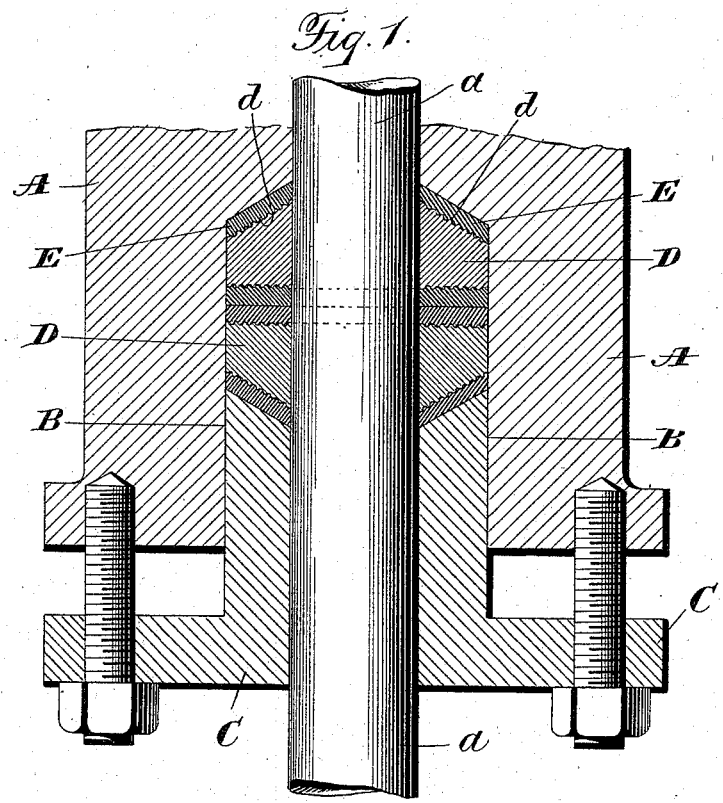
Figure 2:
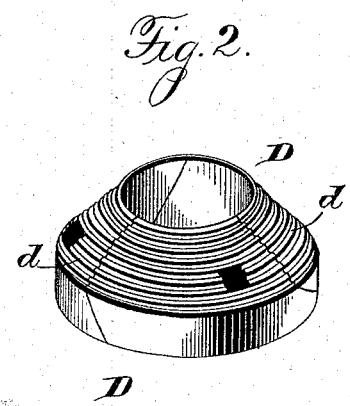

Figure 1 is a longitudinal section of a stuffing box and a portion of a piston rod, with my packing applied; Fig. 2, a perspective view of one of the metal packing rings.

Letters of like name and kind refer to like parts in both figures.

My invention relates to packing for piston rods and the like that is composed of soft metal rings, and rings of some flexible material, as rubber that inclose, and are adapted to be forced against the rod, and it has been my object to provide a construction that will enable the flexible rings to be pressed against the rod with no greater force than the metal rings, and thus avoid the rapid wearing out of the rubber, or other material, compared with the metal.

With this object in view my invention consists in the packing having the construction substantially as and for the purpose hereinafter specified.

In the carrying of my invention into practice, a stuffing box A of usual construction is employed, having the piston rod opening $a$ and a packing receiving chamber B whose inner end is preferably beveled or conical, as shown. The gland C is also of usual construction and preferably has its packing engaging end made conical or beveled.

The packing consists of two similar sectional or divided soft metal rings D, D which circumferentially fill the chamber B, and each of which have a plane or flat and a conical face, and rings E, E of rubber, or other flexible material that are placed between the rings D, D, and between the latter and the end of chamber B, and the gland C. The rings D, D are arranged so that their plane faces are opposite each other while the conical face of one is toward the conical end of the chamber B, and the conical end of the other is toward the like end of the gland C. There are preferably two flexible rings or washers E, E, between the two rings D, D, while there is but one between the conical end of one ring D and the chamber B, and the like end of the other ring D and the gland C.

With the constructions heretofore used the yielding or flexible rings or washers, have worn out rapidly because, by reason of their nature, they have been forced with greater pressure upon or against the rod or other part to be packed than the metal rings, when force was applied to both by the gland. I remedy this serious defect by causing the flexible rings to move toward the rod to the same extent as the metal rings so that the pressure exerted by the two thereon will be identical. I accomplish this object by connecting the flexible rings to the metal rings, and one of the many ways of doing this is by roughening the surface of the metal ring against which the other bears, by a series of concentric corrugations or ribs $d$, so that when the gland is moved inward the flexible ring will be embedded in the corrugations and thus be retarded in its movement over the face of the metal ring to an extent to make its movement toward and pressure upon the rod the same as the metal ring.

Instead of the corrugations, or ribs $d$ pins alone may be employed to unite the two kinds of rings, or they may be used supplementary to the ribs or corrugations, but the latter are preferably employed as they enable the entire abutting surfaces to be interlocked. I do not, however limit myself to any particular means for uniting the rings, as I regard the scope of my invention as including any means for causing them to adhere whereby the object sought is attained. I also wish it understood that as my invention is applicable to the packing of pistons, I do not limit myself only to it as applied to piston rods.

Having thus described my invention, what I claim is—

1. As an improvement in packing, in combination with the part to be packed, metal, and yielding or flexible rings, connections between the whole of the adjacent surfaces of said rings whereby they will be forced with like pressure upon said part, and means to subject the rings to lateral pressure, substantially as and for the purpose specified.

2. As an improvement in packing, in combination with the part to be packed, metal and yielding or flexible rings, the metal ring having its whole surface in engagement with the other roughened to connect them together so as to cause them to be forced with like pressure upon said part and means to subject each ring to lateral pressure, substantially as and for the purpose shown.

3. As an improvement in packing, in combination with a piston rod and stuffing box, the two metal rings having roughened faces, the yielding or flexible rings between and at the ends of said metal rings and engaging such roughened faces, substantially as and for the purpose set forth.

In testimony that I claim the foregoing I have hereunto set my hand this 5th day of September, 1893.

ALLAN B. KAY.

Witnesses:
WILLIAM A. CROSBY,
JOHN JOS. HAMILTON.